US005705921A

United States Patent [19]

Xu

[11] Patent Number: 5,705,921
[45] Date of Patent: Jan. 6, 1998

[54] LOW NOISE 3V/5V CMOS BIAS CIRCUIT

[75] Inventor: Ping Xu, Milpitas, Calif.

[73] Assignee: Cypress Semiconductor Corporation, San Jose, Calif.

[21] Appl. No.: 635,022

[22] Filed: Apr. 19, 1996

[51] Int. Cl.[6] .................. G05F 3/16; H02J 1/04

[52] U.S. Cl. .................. 323/313; 327/538

[58] Field of Search .................. 323/313, 314, 323/315, 316; 327/538

[56] References Cited

U.S. PATENT DOCUMENTS

| | | | |
|---|---|---|---|
| 4,638,134 | 1/1987 | Kimura | 323/286 |
| 4,723,108 | 2/1988 | Murphy et al. | 323/315 |
| 4,859,928 | 8/1989 | Etheridge | 323/314 |
| 4,883,976 | 11/1989 | Deane | 307/443 |
| 4,978,905 | 12/1990 | Hoff et al. | 323/314 |
| 5,045,773 | 9/1991 | Westwick et al. | 323/316 |
| 5,179,297 | 1/1993 | Hsueh et al. | 307/296.6 |
| 5,216,380 | 6/1993 | Carbou | 330/253 |
| 5,296,801 | 3/1994 | Ohtsuka et al. | 323/313 |
| 5,334,948 | 8/1994 | Fong et al. | 330/253 |
| 5,578,964 | 11/1996 | Kim et al. | 330/253 |

*Primary Examiner*—Peter S. Wong
*Assistant Examiner*—Bao Q. Vu
*Attorney, Agent, or Firm*—Bliss McGlynn, P.C.

[57] ABSTRACT

The present invention concerns a circuit for implementing a low noise bias circuit that operates at 3 volts, 5 volts or any desired power supply voltage while avoiding production reconfiguration or post-production configuration. The present invention is implemented by using a current source designed to provide a constant current under differing conditions (e.g., such as a variation in temperature, a variation in power supply, or conditions encountered in a fast transistor process). The present circuit provides a means to adapt to varying conditions. The present circuit generally provides two bias signals that are typically used in a pre-driver circuit implementing NMOS and PMOS transistors.

15 Claims, 3 Drawing Sheets

LOW NOISE 3V/5V CMOS BIAS CIRCUIT

FIELD OF THE INVENTION

The present invention relates to buffer and bias circuits generally, and more particularly, to a low noise buffer and bias circuit that operates at any input voltage (for example at either 3 volts or 5 volts) without the need to preprogram the circuit to work at a specific input voltage.

BACKGROUND OF THE INVENTION

The trend in integrated circuit (IC) design is to produce circuits that can be operated at reduced power supply voltages (Vcc). Power reduction constraints have reduced the industry standard power supply voltage from 5 volts to about 3 volts. However, not every IC works with a 3 volt power supply voltage. A transition time is present where certain chips, such as timing chips, should work with either a 3 or a 5 volt power supply voltage.

It is desirable to have a low noise bias circuit that operates at either a 3 volt or a 5 volt power supply input voltage. Such flexibility may help avoid the need for reconfiguration at either the production level or the post production level. It is also desirable to have a low-noise IC output buffer and bias circuit that works at both 3 volts and 5 volts and has a constant rising and falling time (1~2 V/ns) over a wide range of power supply, temperature and process conditions. Conventional bias circuits are typically required to be configured for a specific operating voltage. This is a disadvantage for products manufactured when both 3 volt and 5 volt systems may be in operation.

A bias circuit for use with a 5 volt input voltage Vcc is shown in FIG. 1 (see U.S. Pat. No. 4,978,905, incorporated herein by reference in its entirety). This approach generally configures a supply reference circuit and a number of transistors to produce a single output reference voltage. The output of the approach illustrated in FIG. 1 is graphically compared to that of the present invention in FIG. 4. One apparent disadvantage with the approach in FIG. 1 is that, once programmed for a 5 volt input, it exhibits less than optimal performance at a 3 volt input voltage. At an input voltage of 5 volts, the optimal linear operating range of the approach illustrated in FIG. 1 is from about 4.5 volts to about 6.5 volts. This bias circuit may also have a low Power Supply Rejection Ratio (PSRR) for certain chips working in a noisy environment. The power supply noise may be directly injected into the circuit, which may further result in the production of unnecessarily high jitter.

SUMMARY OF THE INVENTION

The present invention concerns a circuit for implementing a low noise bias circuit that operates at any power supply voltage (e.g., either 3 volts or 5 volts) while avoiding any need for production reconfiguration or post-production reconfiguration. The present invention may provide a constant current at different operating and processing conditions, such as those typically encountered in a fast transistor process, a variation in temperature or a variation in power supply. The present circuit thus adapts to varying conditions, and may be implemented by using a current source and three amplifiers. The circuit generally provides two bias signals that are typically used in a pre-driver circuit implementing, for example, NMOS and PMOS transistors.

The objects, features and advantages of the present invention include a low-noise output buffer and bias circuit that operates at 3 volts, 5 volts or any other desired voltage (e.g., 2.5 to 7 volts) and maintains constant rising/falling times. The present output buffer and bias circuit compensates for voltage, temperature and process variations while maintaining low noise, high Power Supply Rejection Ratio (PSRR) and low jitter.

BRIEF DESCRIPTION OF THE DRAWINGS

These and other objects, features and advantages of the present invention will be apparent from the following detailed description and the appended drawings and claims in which:

DETAILED DESCRIPTION OF THE PREFERRED EMBODIMENTS

Figure 2:
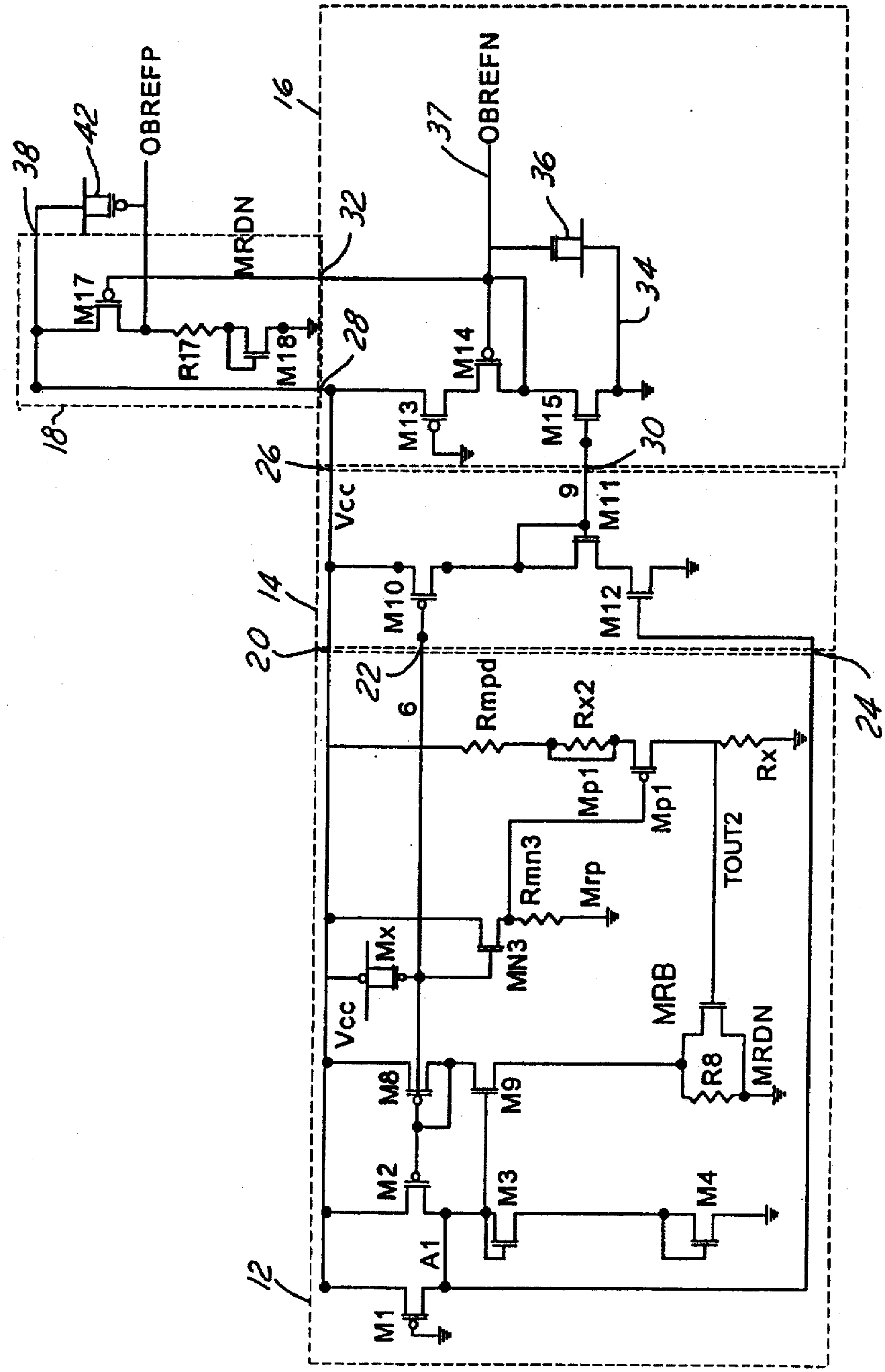
FIG. 2 is a circuit diagram of a preferred embodiment of the present invention.

Referring to FIG. 2, a diagram of a circuit 10 is shown in accordance with a preferred embodiment of the present invention. The circuit 10 generally comprises a current source portion 12, a first amplifier section 14, a second amplifier section 16 and a third amplifier section 18. A source of a transistor M1, a source of a transistor M2, a source of a transistor M8, a source of a transistor MN3 and a first side of a resistor Rmpd are coupled to an input supply voltage Vcc. The input voltage Vcc is also presented to the first amplifier section 14 at an input 20. The inverted gate of the transistor M1 is coupled to ground. The inverted gate of the transistor M2 is coupled to both the inverted gate and the drain of the transistor M8 as well as to the source of a transistor M9. The transistor M9 is configured to form a feedback path TOUT2. The feedback path TOUT2 may improve the temperature and process performance of the current source 12 to produce a more stable and constant current.

The drain of a transistor M2 is coupled to the drain of the transistor M1 and forms a current source node A1. The current source node A1 is coupled to the gate of the transistor M9, the drain and gate of the transistor M3 and is also presented to the first amplifier section 14. The source of the transistor M3 is coupled to the drain and the gate of the transistor M4. The source of the transistor M4 is coupled to ground. The drain of the transistor M9 is coupled to the drain of a transistor MR8 as well as to a first end of a resistor R8. A second end of the resistor R8 is coupled to the source of the transistor MR8 as well as to ground. The gate of the transistor MR8 is coupled to the drain of a transistor MP1 as well as to a first end of a resistor Rx. A second end of the transistor Rx is coupled to ground. The gate of the transistor MP1 is coupled to the drain of the transistor MN1 as well as to a first side of a resistor Rmn3. A second end of the resistor Rmn3 is coupled to ground. A source of the transistor MP1 is coupled to both the first and second end of the resistor Rx2 as well as to a first end of a resistor Rmpd. A second end of the resistor Rmpd is coupled to the source of the transistor MN3 and the input 20 to the first amplifier section. The drain of the transistor MN3 is coupled to the input 20 of the first amplifier section 14.

The transistors M1–M4, M8, M9 and the resistor R8 make up the first part of a reference circuit similar to the previous approaches. The first part of the reference circuit provides substantially constant low voltage current under limited operating conditions such as process, temperature and power supply variations. By "substantially constant current", it is meant that the current does not vary by more than +/−35% from its median value. The addition of the feedback circuit created by the transistors MN3, MP1 and MR8 as well as the resistors RMN3, RX and RX2 compensate to allow a constant current to be produced over a large range of process, temperature and power supply variations. Specifically, higher temperatures may cause the current to drop. The feedback circuit may compensate for this effect. For example, in a fast process, the current through resistor R8 goes up, the voltage presented to the input 22 goes up and the voltage TOUT2 present at the gate of the transistor M8 goes down. Accordingly, the current drops in the transistor MR8. As a result, the total current through the transistor MR8 remains constant. Generally, the size of the transistor MR8 is preferably kept to a minimum to limit the gain of the feedback loop.

The first amplifier section 14 comprises a transistor M10, a transistor M11 and a transistor M12. The input voltage Vcc received at the input 20 is coupled to a source of the transistor M10 and is also presented to the second amplifier 16 at an input 26 and to the third amplifier 18 at an input 28. The drain of the transistor M10 is coupled to both the source and the gate of the transistor M11 and is presented to an input 30 of the second amplifier 16. The drain of the transistor M11 is coupled to the drain of the transistor M12. The source of the transistor M12 is coupled to ground while the gate of the transistor M12 receives the input 24.

The transistor M12 may be biased by the current source node A1. Binding may greatly reduce the effect that variations in the input voltage Vcc have on the circuit 10. Additionally, the linear range of the entire circuit 10 may be increased. The current produced by the transistor M10 is preferably roughly constant. The transistor M12 may function as a constant active load to increase the gain of the amplifier section 14. The gate bias of the transistor M12 is coupled to the current source node A1. However, there is no direct relationship between the transistor M12 and the input voltage Vcc. As a result, a high PSRR and linear operation range may be realized over a wide range of variations of the input voltage Vcc. Additionally, through processing technology, the transistor M12 may consume a smaller chip real estate than a resistor. The transistor M12 may also have a positive temperature coefficient in its working region. As a result, the first amplifier section 14 may correct a negative temperature coefficient of the current source node 8 (i.e., higher temperature results in lower current), and a signal may be produced at the node 9. The signal produced at the node 9 is presented to the input 30 of the second amplifier 16 and is self-compensated with respect to process, temperature and power supply variations.

The second amplifier section 16 generally comprises a transistor M13, a transistor M14, a transistor M15 and a transistor 36. A source of the transistor M13 receives the input voltage Vcc from the input 26. The gate of the transistor M13 is connected to ground. The drain of the transistor M13 is coupled to the source of the transistor M14. The drain and gate of the transistor M14 are coupled together and are presented to the source of the transistor M15. The gate of the transistor M14 is also presented to an input 32 of the third amplifier 18 and provides an output OBREFN. The gate of the transistor M15 receives a signal from the input 30. The source of the transistor M15 is coupled to ground. The source and drain of the capacitively coupled transistor 36 are coupled to ground. The gate of the transistor 36 is coupled to the output OBREFN.

The transistors M13–M15 may provide a second stage of amplification of the signal received at the input 30. The transistor M15 uses a current mirroring effect to provide a constant current. The transistor M14 and M15 preferably operate in a saturation mode while the transistor M13 preferably operates in a linear mode. The voltage across the source and drain of the transistor M13 may vary under different temperature, voltage and process conditions to keep the transistor M14 operating in the saturation mode to provide the constant current. The voltage OBREFN present at the output 37 can therefore adjust to the variations in the input voltage Vcc, temperature and process conditions. The voltage OBREFN may provide an exceptionally stable bias voltage for a PMOS current source.

The third amplifier 18 generally comprises a transistor M17, a transistor M18 and a resistor R17. The source of the transistor M17 is coupled to the input voltage Vcc received at the input 28. The source of the transistor M17 is also coupled to the output 38. The drain of the transistor M17 is coupled to a first side of the resistor R17 as well as to an output 40. The second side of the resistor R17 is coupled to both the source and the gate of the transistor M18. The source of the transistor M18 is coupled to ground. The inverted gate of the transistor M17 receives a signal from the input 32. The output 40 presents a voltage OBREFP and is coupled to the gate of a capacitively coupled transistor 42. The source and drain of the capacitively coupled transistor 42 are coupled to the input supply voltage Vcc. The voltage OBREFN remains at a constant voltage despite changes in the input supply voltage Vcc ranging between 2.7 and 7 volts. The voltage OBREFP remains linear despite changes in the input supply voltage between 2.7 and 7 volts. The voltages OBREFN remains constant when the supply voltage is less than 3 volts, more than 5 volts or fluctuates between values of 3 and 5 volts. The voltage OBREFP remains linear despite changes in the input supply voltage being less than 3 volts, being between 3 and 5 volts or being above 5 volts. The voltage OBREFN remains constant if the input supply voltage varies between 3.5 and 4.5 volts. The voltage OBREFP remains linear despite changes in the input supply voltage between 3.5 and 4.5 volts.

The voltage OBREFP may be created by the third amplifier 18. The transistors M17, M18 and the resistor R17 may use the voltage OBREFN received at the input 32 to provide an inverted bias voltage OBREFP. The bias voltage OBREFP may also be isolated from variations in the input voltage Vcc to produce a high PSRR. The bias voltage OBREFP may provide an exceptionally stable bias voltage for an NMOS current source. Under "fast transistor" conditions, the bias voltage OBREFN can move towards the input voltage Vcc while the bias voltage OBREFP moves towards ground. The effect of this combination is to slow down the pull-up and pull-down pre-drivers to prevent the pad from switching too rapidly. Additionally, when other conditions change, the bias voltage OBREFP and the bias voltage OBREFN may adjust accordingly to speed up or to slow down the pre-driver to keep the speed of the pad constant.

Figure 3:
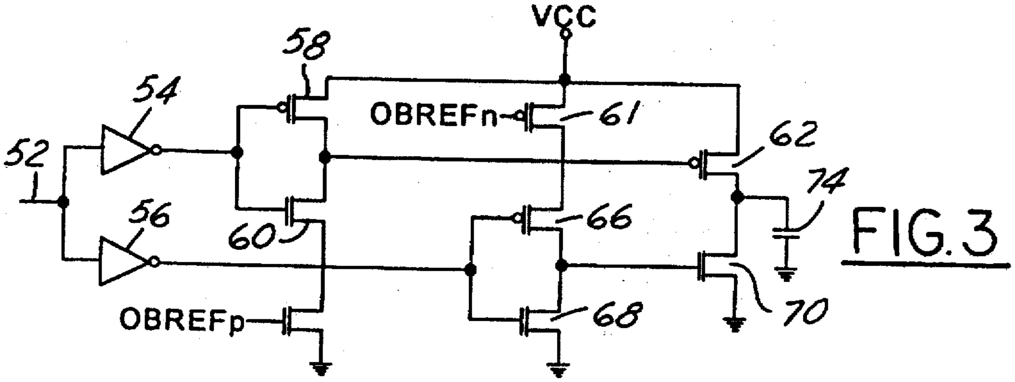
FIG. 3 is a circuit diagram of the output buffer portion of the present invention.

Referring to FIG. 3, a typical output buffer 50 is shown that can be used in an application of the circuit 10. The transistors 58, 60 and 64 comprise a pull-up pre-driver. The transistors 61, 66 and 68 comprise a pull-down pre-driver. The transistor 62 and 70 comprise a driver. An input 52 is received by a first inverter 54 and a second inverter 56. An output of the first inverter 54 is presented to a gate of a transistor 58 as well as to a gate of a transistor 60. An input voltage Vcc is coupled to the source of the transistor 58, the source of the transistor 60 and the source of a transistor 62. The drain of the transistor 58 is coupled to a drain of the transistor 60 as well as to a gate of the transistor 62. The drain of the transistor 60 is coupled to the source of a transistor 64. The gate of the transistor 64 receives the signal OBREFP from the output 40. The source of the transistor 64 is coupled to ground. The output of the buffer 56 is presented to a gate of a transistor 66 as well as to a gate of a transistor 68. The source of the transistor 66 is coupled to the drain of the transistor 61. The drain of the transistor 66 is coupled to the drain of the transistor 68 as well as to a gate of a transistor 70. The source of the transistor 68 is coupled to ground. A gate of the transistor 61 receives a signal OBREFN from the output 37 of the second amplifier 16. The drain of the transistor 62 is coupled to the drain of the transistor 70 as well as to an output 72. The source of the transistor 70 is coupled to ground. The output 72 is connected through a load capacitor 74 to ground.

Figure 1:
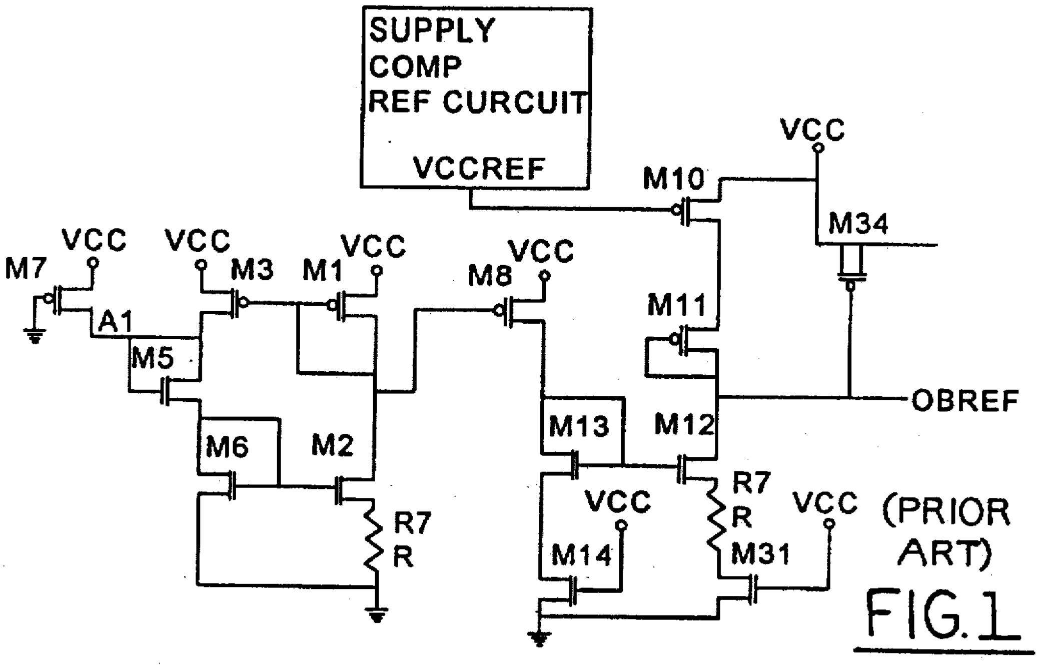
FIG. 1 is a circuit diagram of a previous approach implementing a buffer and bias circuit.
Figure 4:
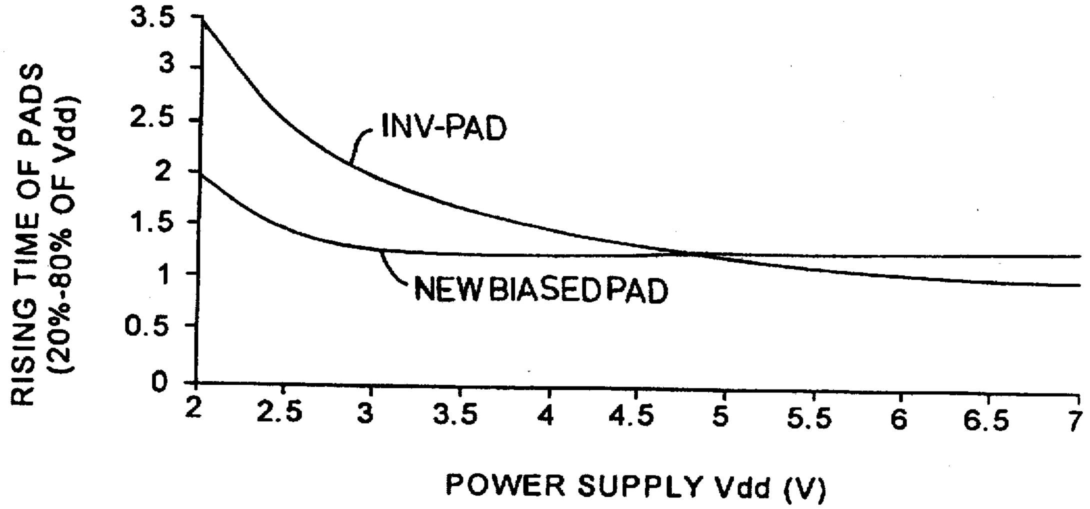
FIG. 4 is a graphical representation of the rising time vs. VDD of both the previous approach device and the present invention.

FIG. 4 shows a graphical representation of the rising time vs. VDD of both a previous approach device and the present invention. The New Biased Pad Curve shows the rising time of circuit 10 while the In-Pad Curve shows the rising time of the circuit of FIG. 1. The vertical axis of the graph represents the rising time measured in nanoseconds. The horizontal axis represents the input power supply VDD measured in volts. The circuit 10 clearly provides a more stable response over a wider voltage range than the circuit of FIG. 1.

Figure 5:
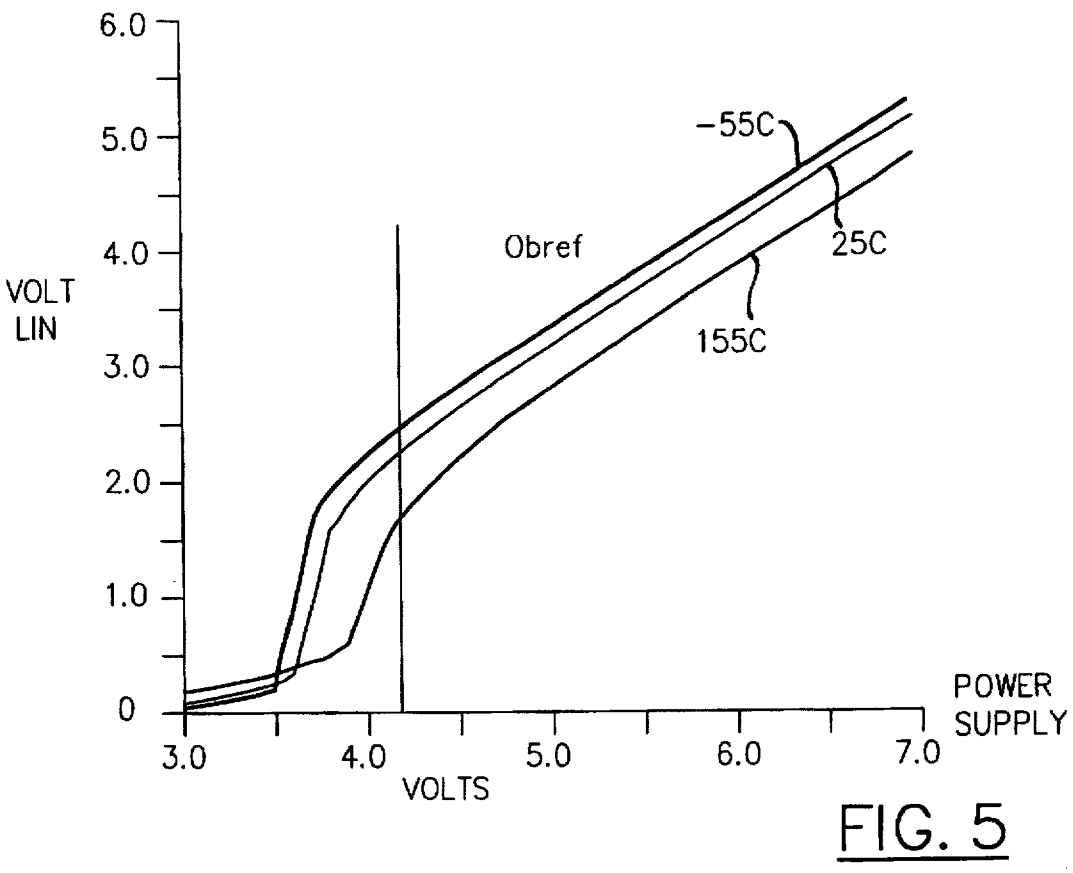
FIG. 5 is a graphical representation of the signal OBREF and Vcc of the second previous approach bias circuit.

FIG. 5 is a graphical representation of the signal OBREF vs. Vcc of the previous approach bias circuit. The vertical axis represents the output voltage ranging between 0 and 6.0 volts. The horizontal axis represents the input power supply voltage ranging between 0 and 7.0 volts. The input power supply voltage between 3.5 and approximately 4.25 volts illustrates an extremely inconsistent voltage range. The OBREF signal is shown having three different temperature conditions at −55° C., 25° C. and 155° C.

Figure 6:
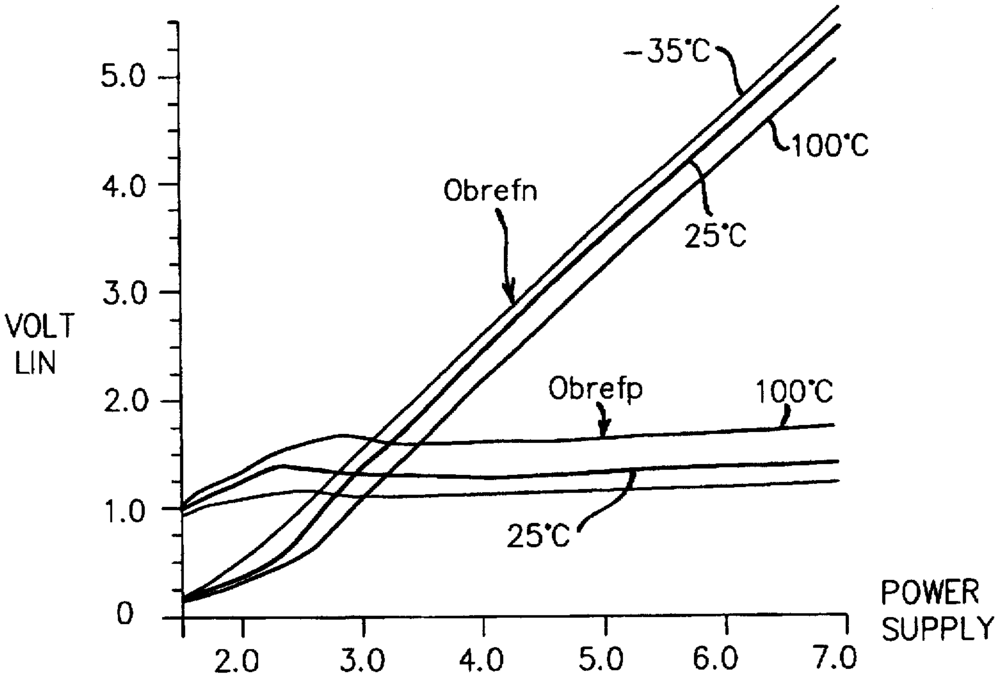
FIG. 6 is a graphical representation of the OBREFN, OBREFP signals vs. Vcc of the present invention.

FIG. 6 is a graphical representation of the OBREFN and OBREFP signals vs. Vcc of the present invention. The vertical axis represents the linear range of the output voltage ranging between 250.0 m volts and 5.25 volts. The horizontal axis represents the input power supply voltage input which is shown ranging between 1.5 volts and 7.0 volts. The signals OBREFN and OBREFP are shown to be linear between approximately 2.5 volts and 7.0 volts. This linear voltage range is shown at −35° C., 25° C. and 100° C. The OBREFP signal is shown at the same three temperatures.

The current source 12 may provide first-order constant current through the transistor M8 under various conditions. Specifically, when the input supply voltage Vcc increases (i.e., during fast process conditions) the voltage at node 8 will increase to maintain a constant current through the transistor M8. This current source can provide the bias voltage at node 8 which has a first order of compensation for process, temperature and supply voltage variations. The first amplifier section 14 amplifies the signal at node 8 to produce a bias voltage at the input 24. The first amplifier 14 uses the current source at the node 9 to increase the gain and PSRR. The first amplifier section 14 generally has a negative temperature coefficient to correct for a positive temperature coefficient realized at the node 8. This design allows for a wide linear operating range.

The second amplifier section 16 amplifies the signal received at the input 24 to provide the signal OBREFN that may be used as a current source for a P-type device. The third amplifier section 18 uses the signal OBREFN as an input and inverts the signal to produce the signal OBREFP. The signal OBREFP may be used as a current source to drive an N-type device. As a result of the first amplifier section 14, the second amplifier section 16 and the third amplifier section 18, the signals OBREFN and OBREFP are process, temperature and supply voltage, compensated to maintain a generally linear operating voltage over a wide range of input supply voltages.

When the signals OBREFN and OBREFP are used to control a pull-up and pull-down pre-driver circuit, the generally linear operating range will provide a circuit having low noise. While the circuit 10 has been described having an operating range between 2.7 volts and 7.0 volts, additional modifications can be made to operate at either a higher voltage or a lower voltage. The circuit 10 can be used in low noise output buffer applications as well as current source applications and delay cell applications.

While the invention has been particularly shown and described with reference to preferred embodiments thereof, it will be understood by those skilled in the art that various changes in form and details may be made without departing from the spirit and scope of the invention.

I claim:

1. A circuit comprising:

a first circuit configured to generate independent first and second outputs each having a substantially constant current in response to an input voltage;

a second circuit configured to generate a third output in response to said first and said second outputs, wherein said third output has an increased gain relative to said first and second outputs;

a third circuit configured to generate a first bias output in response to said third output; and a fourth circuit configured to generate a second bias output in response to said first bias output, wherein said first and second bias outputs are substantially linear over an input voltage range of from 2.5 to 7.0 volts.

2. The circuit according to claim 1 wherein said input voltage ranges between 3 and 5 volts.

3. The circuit according to claim 1 wherein said input voltage ranges between 3.5 and 4.5 volts.

4. The circuit according to claim 1 wherein said first circuit comprises a current source, said second circuit comprises a first amplifier, said third circuit comprises a second amplifier, and said fourth circuit comprises an amplifier.

5. The circuit according to claim 1 wherein:

one of said first and second outputs comprises a reference voltage; and said second circuit comprises a feedback circuit.

6. The circuit according to claim 5 wherein said first circuit comprises a plurality of transistors.

7. The circuit according to claim 5 wherein said feedback circuit comprises a plurality of transistors.

8. The circuit according to claim 1 wherein said second circuit comprises a plurality of transistors.

9. The circuit according to claim 1 wherein said second circuit comprises:

a first transistor having a gate coupled to said first output;

a second transistor having a source and a gate coupled to said drain of said first transistor, wherein said drain of said second transistor generates said third output; and a third transistor having a gate coupled to a source of the second transistor and a gate coupled to said second output.

10. The circuit according to claim 1 wherein said third circuit comprises:

a first transistor having a gate coupled to said third output and a source for providing said bias output;

a second transistor having a drain and a gate coupled to said source of said first transistor; and a third transistor having a drain coupled to said source of said second transistor.

11. The circuit according to claim 1 wherein said fourth circuit comprises:

a first transistor having a gate coupled to said bias output and a drain for providing said second bias output; and a second transistor having a source and a drain coupled to said drain of said first transistor.

12. The circuit according to claim 4 wherein said second circuit generates an active load between said current source and said second amplifier.

13. The circuit according to claim 10 wherein said third circuit generates a current mirror between said second circuit and said bias output.

14. The circuit according to claim 10 wherein said second transistor operates in a saturation mode and said first and third transistors operate in a linear mode.

15. A circuit comprising:

means for generating independent first and second outputs each having a substantially constant current in response to an input voltage;

means for generating a third output in response to said first and said second outputs, wherein said third output has an increased gain relative to said first and second outputs;

means for generating a first bias output in response to said third output; and means for generating a second bias output in response to said first bias output, wherein said first and second bias outputs are substantially linear when said input voltage ranges from 2.5 to 7.0 volts.

* * * * *